Oct. 13, 1936.  A. C. LINDGREN  2,057,650
AUXILIARY POWER DEVICE FOR TRACTORS
Filed Aug. 9, 1935  4 Sheets-Sheet 1
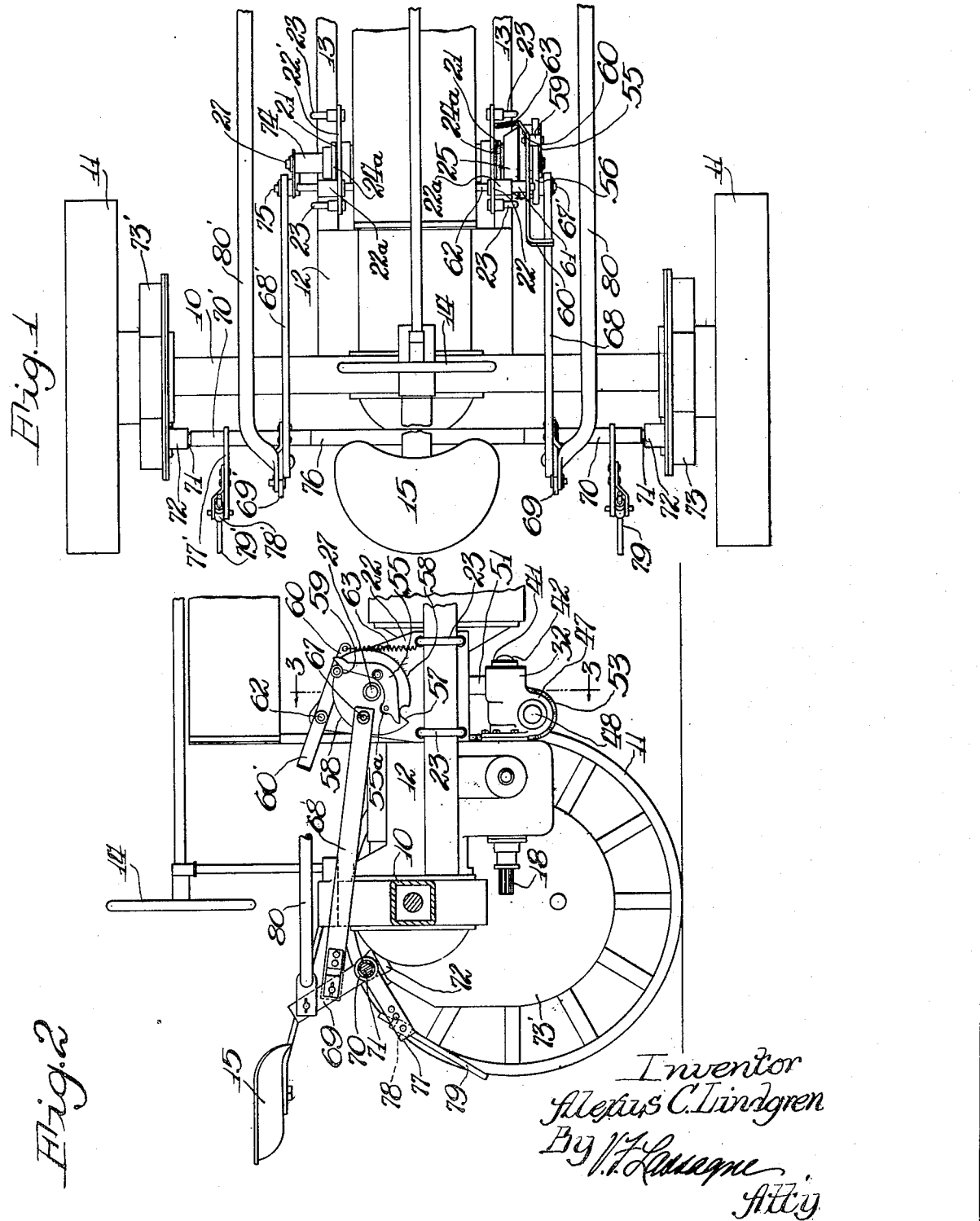

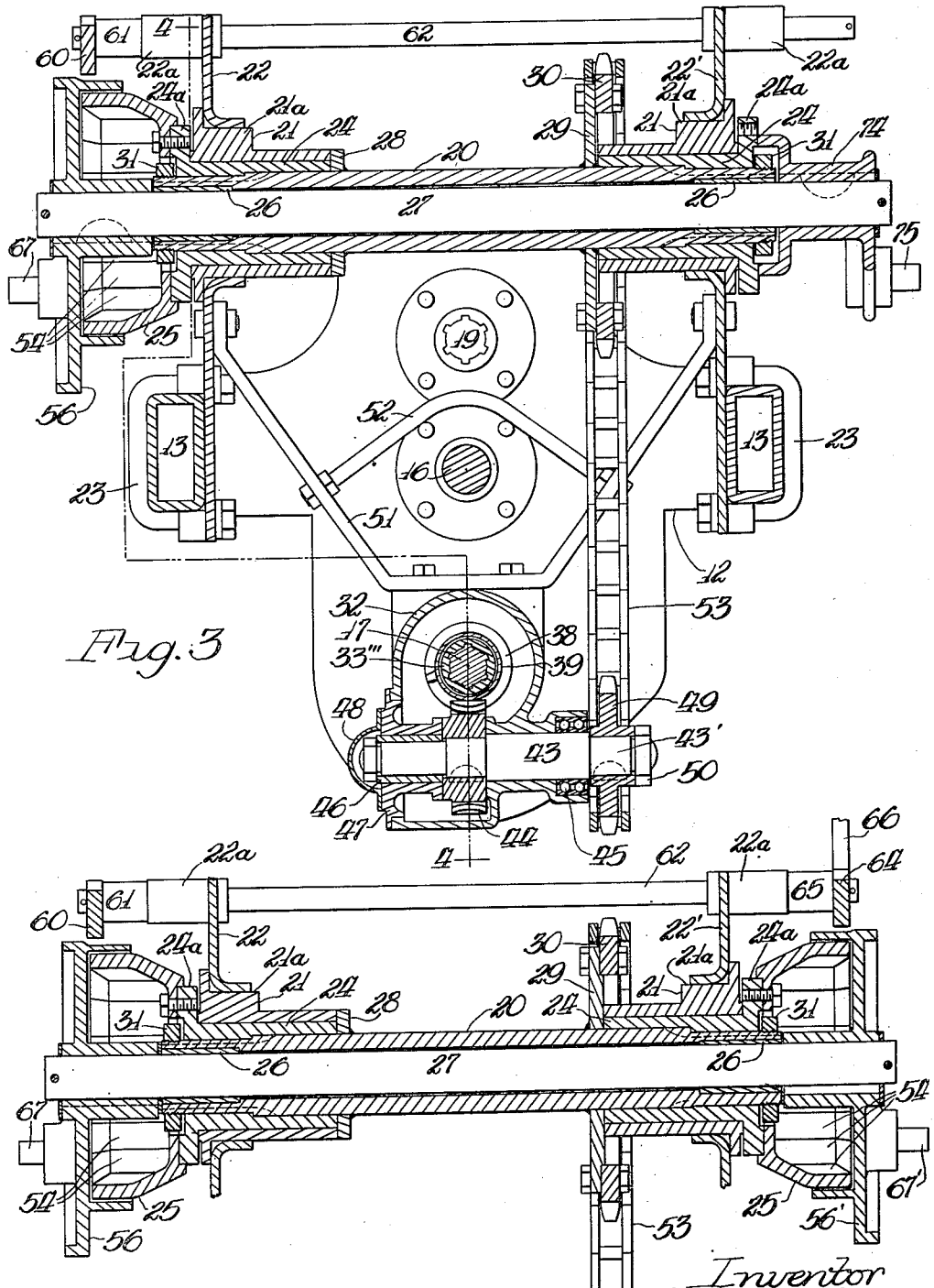

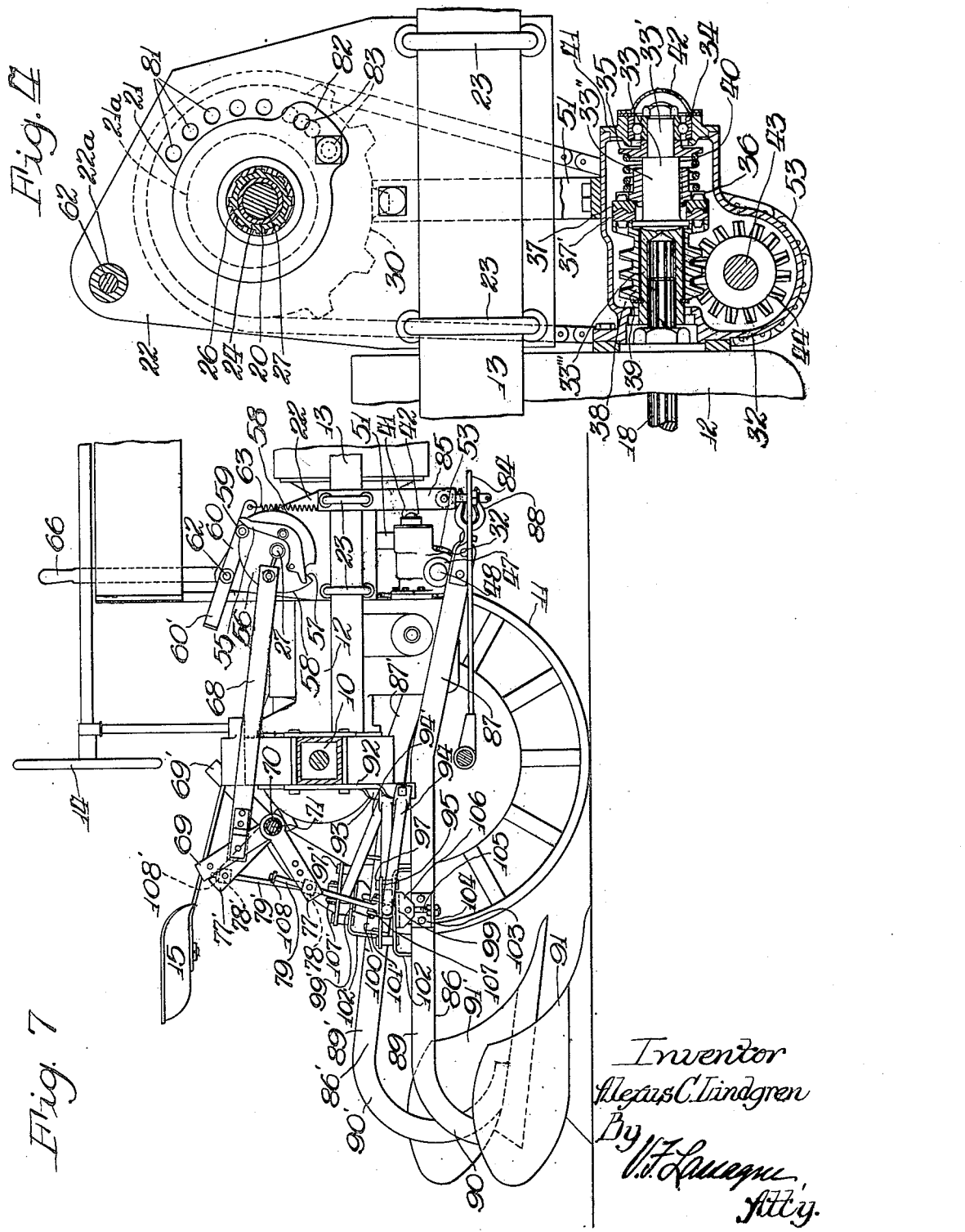

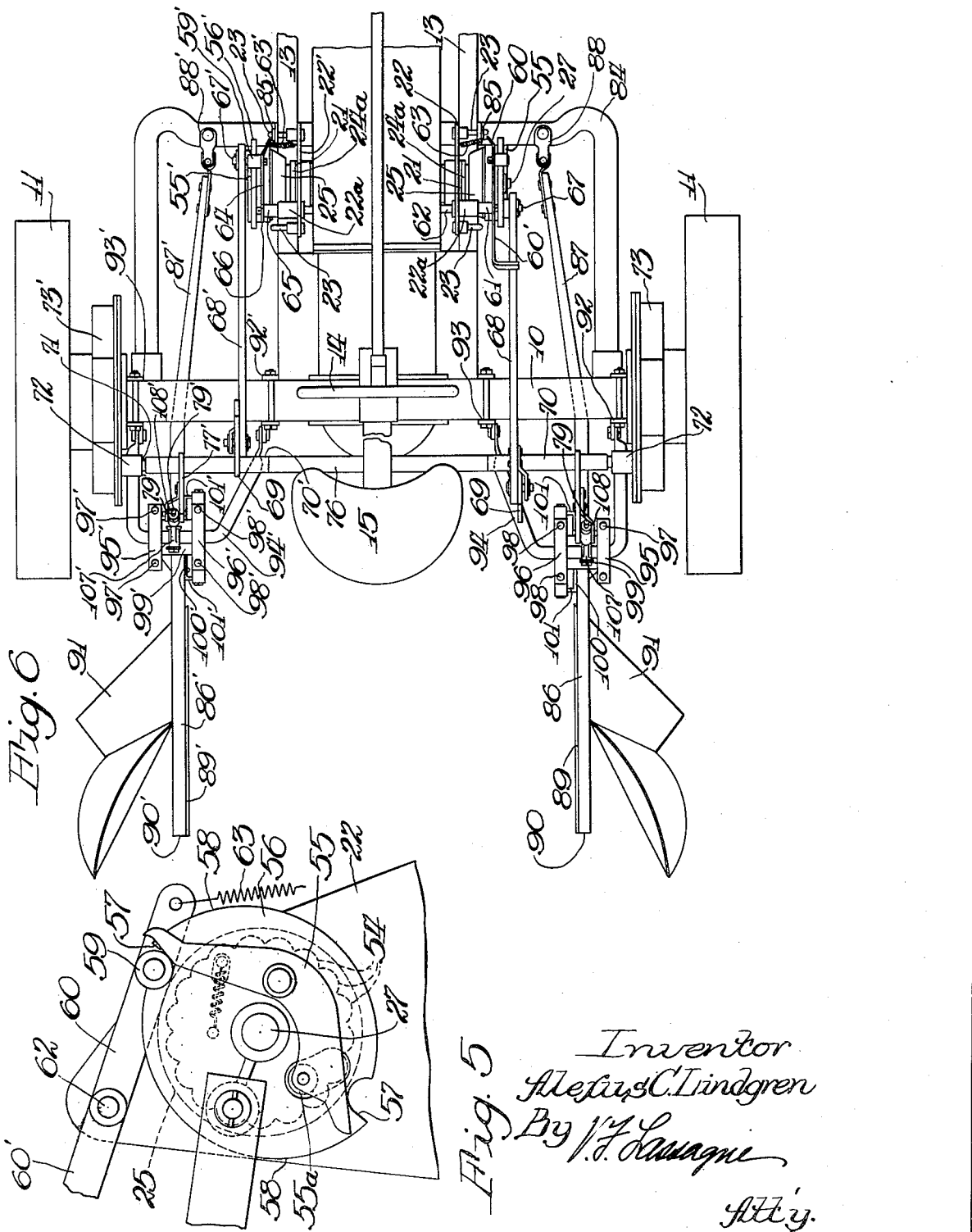

Patented Oct. 13, 1936

2,057,650

UNITED STATES PATENT OFFICE 2,057,650

AUXILIARY POWER DEVICE FOR TRACTORS

Alexus C. Lindgren, Chicago, Ill., assignor to International Harvester Company, a corporation of New Jersey Application August 9, 1935, Serial No. 35,409

19 Claims. (Cl. 97—50)

The present invention relates to auxiliary power devices for tractors, and more particularly to engine driven mechanism for driving and adjusting implements mounted on, or connected to, the tractor.

The main object of the invention is to provide a simple and compact form of power lift mechanism and locate it on the tractor where it will not interfere with vertical movements of any implement that may be close coupled to the tractor at the rear, as may occur with rearwardly positioned lifts, and where it is conveniently available for operation of the lifting connections of implements at the front and rear of the tractor.

Another object of the invention is to provide a power lift of the one-half revolution type in which direct connected implements may be raised or lowered separately, such as for instance, a two-way plow in which the right hand plow may be lowered into plowing position and leaving the left hand plow at raised position to be lowered on return of the tractor across the field in a direction opposite to the first plowing position.

Other objects of the invention are to provide a novel chain tightener so that the chain drive of the mechanism may be tightened whenever it is desired and means in the drive mechanism for the power lift device to protect it from damage through overloading.

Another object of the invention is to drive the power lift mechanism from a power shaft located forward of the axle.

Another object of the invention is to provide means connected to the power lift mechanism so that front and rear connected implements may be simultaneously raised or lowered.

Another object of the invention is to provide means of connection to the power lift mechanism allowing front and rear implements placed on either side of the tractor to be simultaneously raised or lowered and rear implements on either side of the tractor to be raised or lowered separately from the other.

The foregoing, as well as other objects which will appear from the description to follow are attained by the construction and arrangement of parts hereinafter disclosed and claimed, and illustrated by the accompanying drawings, where:

Figure 1 is a plan view showing the rear portion of a tractor with the auxiliary power device in position thereon;

Figure 2 is a side elevation of Figure 1;

Figure 3 is an enlarged transverse sectional view on the line 3—3 of Figure 2 looking in the direction of the arrows;

Figure 4 is a detailed sectional view on the line 4—4 of Figure 3 looking in the direction of the arrows;

Figure 5 is a detailed side view of the clutch mechanism seen in section in Figure 3;

Figure 6 is a plan view showing the rear portion of a tractor with the auxiliary power device in position thereon connected to a two-way plow;

Figure 7 is a side view of Figure 6 with the right wheel removed and partly in section, showing one of the plows in raised position and the other in lowered position; and Figure 7 is a side view of Figure 6 with the similar to that of Figure 3 but showing two power lift clutches of the one-half revolution type connected to both sides of the power lift attachment so that implements such as a two-way plow may be alternately raised and lowered without affecting the position of the other implement attachment.

The invention to be disclosed is a continuation in part of the applicant's application Serial No. 722,661, filed April 27, 1934. For the purpose of this disclosure, the invention has been illustrated in connection with the rear portion of a row crop tractor having a rear axle structure 10 of the wide tread type supported on traction wheels 11. The tractor body comprises a transmission housing 12 secured to the axle structure and forwardly extending side frame members 13 which support the engine and other parts of the tractor. The side members are carried at the front on suitable steering wheels, not shown, which are controlled by the usual steering wheel 14 adjacent the operator's station 15. As shown in Figure 3, the propeller shaft enters the forward wall of the transmission housing at 16 and a driven shaft within the transmission housing is projected from the forward wall of the transmission casing, as at 17, to provide an external drive connection or power take-off. This power take-off shaft 17 is a forward extension of the rearwardly extending power take-off shaft 18 (Fig. 3) both ends of which are thus made available as power connections. An additional power take-off shaft extends through the forward wall of the transmission housing, as at 19. This power take-off shaft 19 may also be used to provide an external drive connection or power take-off. When not in use the shaft 19 is suitably enclosed. The various power take-off shafts which have been described are suitably controlled by clutch mechanisms operated within reach of the operator's station 15, but are not disclosed as they are not necessary for the understanding of my invention.

The structure embodying the invention comprises a transverse tubular drive shaft 20 which extends across the mid-portion of the tractor body forward of the transmission housing and is best shown in Figures 3 and 8 and has its ends supported in eccentric bearings 21 which are adjustably mounted or otherwise secured in the upright upper right and left hand brackets 22 and 22' which are bolted or otherwise secured at their lower ends to the side members 13 as in this instance, by the clamp U-bolts 23. The tubular shaft 20 has keyed or splined thereon at each end, the bearings 24 which are journaled within the eccentric bearings 21. The bearings 24 have outer flange portions 24a to which are secured the bell shaped portion 25 of a one-half revolution clutch of the well-known pawl and ratchet type. The tubular shaft 20 is formed internally so that the replaceable bearings 26 have mounted therein a rotatable inner shaft 27 which extends beyond the ends of the tubular shaft 20.

At each side of the tractor body welded on the tubular shaft 20 is the thrust collar 28 which acts to take up the thrust from the bearing 24. Oppositely positioned to the thrust collar 28 is the concentric flange 29 which acts as a thrust collar for the bearings 24 and also as a flange for the detachable sprocket 30 secured thereto. To prevent the lateral displacement of the bearings 24 lock nuts 31 are secured at each end of the tubular shaft 20. Dismantling the shaft and its removable bearings 24 may be accomplished by removing the thrust nuts 31. Secured to the forward end of the transmission housing 12 is the casing 32 as best shown in Figures 3 and 4. The housing 32 is formed internally to provide bearings or bearing seats for the movable shafts to be situated thereon. Attached to the power take-off shaft 17 is the shaft 33 connected thereto by means of suitable splines. A forward portion of the shaft 33 is suitably mounted in the bearing 34. On the forward portion 33' of the shaft 33 is the thrust collar 35 slidably mounted. On the portion of the shaft 33'' is the clutch driving collar 36 which is suitably keyed to the shaft 33. Engaging the clutch driving collar 36 are the slip clutches 37 and 37'. The clutch 37' engages the worm driving structure 38 which is loosely mounted on the rear portion 33''' of the shaft 33. A thrust collar 39 engages the shaft 33 and acts to take the thrust of the worm structure 38. Spaced between the thrust collar 35 and the clutch driving collar is the compression spring 40.

This compression spring resiliently holds the clutches 37 and 37' in engagement and permits the clutches to be released when some obstruction prevents the rotation of the worm structure 38. This slip clutch structure acts as a safety feature to prevent breakage of the transmission drive members of the tractor. The bearings 34 are suitably mounted in a removable end member 41 of the housing 32. The structure may be suitably inspected by removing the cap 42. Transversely mounted in the housing 32 is the shaft 43 to which the worm wheel 44 is keyed. The worm wheel 44 engages the worm 38' and is driven thereby. The shaft 43 at one end is supported by the roller bearing 45 and at the other end by the bearing 46. The bearing 46 is mounted in the removable bearing support 47 which is secured to the housing 32. A suitable cap 48 permits inspection of the shaft 43. Secured to the portion 43' of the shaft 43 is the driving sprocket 49. The driving sprocket 49 is suitably keyed to the shaft and is also secured by the nut 50. Portions of the casing 32 and of the removable bearing support 37 act to take the thrust of the worm wheel 44. The housing 32 is suitably braced by the brace member 51 which is secured at its upper ends to the supporting brackets 22 and 22'. An additional lateral brace 52 is secured to the brace member 51. With this supporting structure the housing 32 is rigidly secured against any downward component caused by the thrust of the worm drive. The driven sprocket 30 is properly aligned with the driving sprocket 49 and is driven therefrom by the chain 53. The chain 53 is preferably of the roller type, although other suitable chains may be used.

The tubular shaft 20 in which is journaled the shaft 27 is constantly driven from the power take-off shaft 17 through the worm drive and slip clutch above described, and the inner concentric shaft 27 is intermittently driven by the shaft 20 through the one-half revolution clutch mechanism, which will now be described.

On one of the projected ends of the tubular shaft 20 in this instance at the right side of the tractor, as best shown in Figures 3, 5, and 8, there is secured the bell shaft portion 25 of a one-half revolution clutch of the well-known pawl and ratchet type. In the present instance, the clutch member 25 is shown as comprising a flat portion concentric to the shaft 27 removably secured to the flange portion of the bearing member 24. In Figure 8 like reference numerals describe the same parts as shown in Figure 3. Secured to the left side of this power lift attachment, as viewed from the operator's station 15, is another bell shaft portion 25 of a one-half revolution clutch of the well-known pawl and ratchet type. This member 25 is also similarly secured to the flange portion 24a of the bearing member 24. The two one-half revolution clutches as shown in Figure 8, are used when it is necessary, as in the use of a direct connected two-way plow as shown in Figure 6. The peripheral flange of these clutch members 25, as shown in Figures 3 and 8 are formed with the usual pawl sets or notches 54 on its inner side which are adapted to be engaged by the clutch rollers 55a carried on the usual spring pressed pawl arm 55 which is pivoted on the intermittently rotated member of the clutch.

The right and left hand members 56 and 56', as shown in Figures 3 and 8 are of disk-like form secured to the projecting ends of the inner shaft 27 in complementary relation to the clutch members 25. The periphery of the driven clutch members 56 and 56' are formed with the usual opposite clutch throw-out seats 57 connected by the opposite tracks 58 for the clutch tripping element or roller 59. The clutch pawl arm 55 is controlled by the usual trip arms seen in Figure 5, the ends of which are presented in the throw-out seats 57. The trip roller 59 is carried on the end of a trip arm 60 formed on a sleeve 61 rockable on a cross shaft 62 which is supported in the bearings 22a carried in the brackets 22 and 22' and in parallel relation to the tubular shaft 20. The trip arm 60 is controlled by the rearwardly extending foot operated portion 60' of the trip arm 60 which is normally drawn upwardly by a spring 63 which is secured at one end to the trip arm and at its other end to the supporting bracket 22 in order to retain the trip arm and roller in one of the seats 57 or in contact with the peripheral tracks 58. Upon the downward rocking movement of the rearwardly extending foot operated portion 60', the throw-out roller 59 will release the clutch and permit the clutch to engage. The roller 59 will, upon the release of the trip arm 60, ride on the peripheral track 58 of the clutch member 56 until the roller 59 engages in the opposite throw-out seat 57, thus disconnecting the driven member of the clutch at the completion of its cycle of operation, or half revolution.

As the driven member 56 of the clutch is fixed to the inner shaft 27, this shaft will have corresponding movement. In Figure 8 the clutch member 56' may be also operated to receive an intermittent motion.

In Figure 3 the operation of the clutch engages the driven member 56 of the clutch which is keyed to the shaft 27 thereby imparting its intermittent movement to the shaft 27, but, as shown in Figure 8, the driven member 56 of the clutch is not secured to the shaft 27 but is rotatably mounted thereon. Likewise in Figure 8, the driven member 56' of the one-half revolution clutch on the opposite side of the power lift attachment is not secured to the shaft 27, but the shaft 27 acts to support the rotating driven clutch member 56'. With the shaft 27 stationary, as shown in Figure 8, each of the power lift clutches of the one-half revolution type and the opposite ends of this attachment may be operated simultaneously on the operation of the relative throw-out arms, or each clutch may be operated at will to raise and lower implements in the nature of two-way plows, as shown in Figure 6. The clutch pawl arm 55', as shown in Figure 6 is controlled by the usual trip arms seen in Figure 5, but the clutch pawl arm 55' is of an opposite hand to that which is shown in Figure 5, the ends of which are presented in the throw-out seats 57' of the clutch driven member 56'. The trip roller 59' is carried on the end of a trip arm 64 formed on a sleeve 65 rockable on the cross shaft 62.

The trip arm 64 is controlled by the upwardly extending trip lever 66 which is normally drawn forwardly by a spring 63' to retain the trip arm and roller in one of the seats 57' or in contact with the peripheral tracks 58'. Upon rocking the lever 66 rearwardly, the throw-out roller 59' will release the clutch pawl arm and permit the clutch to engage. The roller 59' will, upon release of the lever 66 ride on the peripheral track 58' of the clutch member 56' until the roller 59' engages in the opposite throw-out seat 57', thus disconnecting the driven member of the clutch at the completion of its cycle of operation, or half revolution. Since the driven member 56' of the clutch is not secured to the inner shaft 27 and since the clutch member 56 also is not secured to the shaft 27, as is shown in Figure 8, the trip clutch members 56 and 56' may be operated separately from the tubular shaft 20 at will.

In order to utilize the intermittent one-half revolution of the shaft 27 in a manner to impart lifting and lowering movement to any implement that may be connected at either the front or rear of the tractor, as shown in Figure 1, the driven member 56 on one end of the shaft 27 has formed thereon a stud 67 providing a pivot bearing for the forward end of a lifting link 68 which extends rearwardly and is pivotally connected at its rear end to an upwardly extended portion 69 of the bell crank lever 70. The bell crank lever 70 is pivotally mounted on the transverse member 71 suitably mounted in the supporting brackets 72 secured to the rear axle housing structure 73 and 73'. The opposite end of the shaft 27 has secured thereto a crank arm 74 as best shown in Figure 3, formed with a stud 75 on its outer end which provides a bearing for the forward end of a second or duplicate lifting link 68' extending rearwardly in parallel relation to the similar link 68 at the other side of the tractor and likewise connected to the upwardly extending arm 69' of the bell crank member 70' similar in all respects to the bell crank member 70, but of the opposite hand. The bell crank members 70 and 70' are laterally spaced by the space pipe 76 on the supporting member 71. The fore and aft rocking bell crank members 70 and 70' are provided with downwardly and rearwardly extending portions 77 and 77', as best shown in Figures 2 and 7. These members 77 and 77' are provided with suitable means 78 and 78' for pivotal connection thereto of downwardly and rearwardly extending lift rods 79 and 79' adapted for connection to rearwardly positioned tractor attached implements. Forwardly extending lift rods 80 and 80', as best shown in Figure 1, and substantially parallel to each other are pivotally connected at their rear ends to the upwardly extending arms 69 and 69'. The forward portions of these lift rods 80 and 80' are adapted for connection to forwardly attached implements, as disclosed in the patent to S. W. Cody, 1,911,306, granted May 30, 1933. Obviously either the front or rear lifting rods may be used separately, or both may be used simultaneously.

As in Figure 7, the forwardly connected lift rods 80 and 80', as shown in Figure 1, might also be connected to the upwardly extending bell crank arms 69 and 69' so that if forwardly and rearwardly connected implements were attached; the forwardly and rearwardly connected implements might be raised simultaneously, or the forwardly and rearwardly connected implements on each side of the tractor might be raised and lowered separately, as are the two-way plow bottoms, as shown in Figures 6 and 7 when attached to the rear of the tractor.

It will be clear that the intermittently driven shaft 27 will be given a half revolution upon its actuation of the clutch mechanism and that alternate actuations will serve to rock the members 70 and 70', first forward and then rearwardly, or vice versa. However, in the structure disclosed in Figure 8 the shaft 27 is stationary, the intermittent motion of the bell crank members 70 and 70' of Figure 6 being obtained through the driven clutch members 56 and 56'.

Figure 4 shows the eccentric bearing 21 which is used to tighten the chain 53. The supporting brackets 22 and 22' are provided with a series of adjusting holes 81 concentrically placed with respect to the portion 21ª of the eccentric. The eccentric 21 has a protruding portion 82 provided with two adjusting holes 83 spaced one and one-half times the arcuate distance of the spacing of the holes 81. In this manner the holes may be so positioned that an adjustment of one-half the spacing of the holes 81 may be obtained.

With this adjustment, as the chain 53 stretches, a link may be removed at will and the tension of the chain satisfactorily adjusted. Figures 6 and 7 show a two-way plow attached to the tractor. This plow construction is similar to the plow design as disclosed in the Patent 1,902,845 to W. S. Graham et al. granted March 28, 1933. The plow construction has been simplified and is only used to illustrate the use of my invention as attached to a two-way plow or other similar implements in which it is desired that the tools on one side of the tractor may be raised or lowered without raising or lowering the tools on the other side of the tractor. The plow construction disclosed here shows the forwardly extending U-shaped draft frame 84 supported from the side sills 13 by the supporting members 85. Each plow attachment, as they are of opposite hands and as they are similar, only one will be described and corresponding prime reference characters will indicate similar parts, comprises a beam 86 and an inwardly and downwardly directed forward portion 87 pivoted at its forward end to a clevis 88 which is in turn pivoted on the draft bar 84. The pivotal connections while on vertical axes are sufficiently loose to permit the necessary vertical movement of the beams during lifting and lowering of the plows. The forward portion 87 of the plow beam extends forward of the axle structure, as shown, and is continued rearwardly as a straight substantially horizontal beam portion 89 terminating in the usual downwardly curved standard 90 on which the plow body 91 is secured.

At laterally spaced points between the differential housing and the depending end housings 73 and 73' at each side of the tractor, there are secured dependent hanging members 92 and 93, the lower ends of which are provided with pivotal openings for the reception of pivot bolts supporting the arms of rearwardly extending bail cranks 94 and 94'. The arms of each bail crank 94 and 94' are offset with respect to one another, and the pivots to the respective hangers 92 and 93 are so positioned that the bight portion of the bail crank is at an acute angle to the longitudinal transverse axis of the axle housings; that is to say, the bail cranks are disposed on lines diverging upwardly from the central longitudinal plane of the tractor to such a degree that, when a plow has been lowered for working position and one of the tractor wheels is in the furrow, the plow beam and plow will be in substantially vertical position.

The bight portion of the bail 94 is positioned immediately above the plow beam at a point between the ends of the beam and preferably nearer the rear end thereof, and the bail crank is pivotally connected to the portion 89 of the beam by a support or saddle composed of two pairs of vertically spaced flat bars or straps 95 and 96 connected by spacer bolts 97 and 98. The bail is loosely seated between the straps and the two pairs are spaced laterally apart so as to engage the mid-portion, or bight portion, of the bail at laterally spaced points. A plate 99 connects the two pairs of straps beneath the bail and the plow beam which is located below this plate between the two pairs of straps.

The beam is suspended by means of a bracket piece 100 secured to the inner, or land side of the beam, and laterally extending ears 101 at the ends which are pivotally connected to similar depending ears 102 formed on the lower strap of the pair 96 at that side. On the opposite side, the beam has a bracket piece 103 fixed to it, which has a horizontal flange 104. This flange has an opening to receive the threaded lower end of a bolt 105 which is bent at its upper end to provide an angular extension received in an opening in an ear 106 depending from the plate 99. Adjusting nuts engage opposite sides of the flange 104, and adjustment of these nuts on the threaded end of the bolt 105 will cause the plow beam to be tilted on its pivot on the opposite side of the beam. This construction provides a tilting or leveling adjustment for the plow and when adjusted, it is held against tilting.

Each plow attachment is raised and lowered by the lift or pick-up link 79 pivoted to a collar at 107 on the bight portion of the bail 94 between the saddle straps 95 and 96 and which has its upper end passing loosely through a pivoted collar 78 suitably mounted on the end of the lift arm 77. The arrangement is such that, when the plow is in lowered position as in Figure 7, the collar 78 will have travelled down the lift rod 79 a sufficient distance to provide for lost motion between the collar 78 and a stop nut 108 on the upper end of the lifting rod 79, thereby allowing the plow to have a certain amount of unrestricted vertical floating movement with respect to the tractor.

In the operation of this tractor attached plow so that the plow may be raised or lowered at will the foot trip 60' is pressed downwardly releasing the roller 59 thereby permitting the clutch driven part 56 of the one-half revolution to be engaged with the drive part 25 of the clutch causing the clutch portion 56 to revolve forwardly oscillating the bell crank member 70 thereby raising the plow and keeping it in raised position as the clutch is rocked out of engagement with the rotating shaft 20 by the roller 59 dropping in the notch 57. Similarly if it is desired to raise or lower the left hand plow beam the hand lever 66 is pulled rearwardly disengaging the roller 59' and then the sequence of operation is similar to that previously described. In the same manner either the right or left hand plow beams may be lowered by operating either the foot lever 60' or the hand lever 66. In this power lift attachment the rotating shaft 20 revolves at all times in one direction thereby as the clutch is operating the bell crank 70 and 70' will be oscillated in a to and fro direction as the clutch driven members 56 and 56' are rotated continuously in one direction. With the construction above described, a simple form of plow attachment is provided in which its capacity for adjustment at the front end and the rear end of the plow beam to meet all requirements of different soil conditions and depths of plowing, and also a lift means which includes provision for adjustment of tilting and for floating movement of the plow independently of up and down movements of the tractor.

With the construction above described the tractor is provided with a source of intermittent power. It will be clear that the intermittently driven shaft 27 will be given a half revolution upon each actuation of the clutch mechanism, as shown in Figure 3, and that alternate actuations will serve to rock the members 70 and 70' first forwardly and then rearwardly or vice versa. Likewise, as shown in Figure 8 it will be clear that the intermittently driven clutch members 56 and 56' will be given a half revolution upon each actuation of their respective clutch mechanisms and that alternate actuations will serve to rock the members 70 and 70' as previously disclosed, first forwardly and then rearwardly or vice versa. It will also be seen from the disclosure that this rocking movement of the said members 70 and 70' is made readily available for the lifting and lowering of any implements, such as plows, cultivators, etc., as may be connected to either or both, the front or rear of the tractor.

The preferred embodiment of the invention above described is illustrative of the invention, the scope of which is defined in the following claims.

What is claimed is:

1. The combination with a tractor having a transmission housing located forwardly of the rear axle structure of the tractor and a power take-off shaft projecting through the forward wall of said housing, of a power lift mechanism mounted on the tractor forward of the transmission housing comprising a rotatably mounted tubular shaft extending across the tractor body, a sprocket secured to the tubular shaft and laterally positioned thereon with respect to the power take-off shaft, a driving connection between said sprocket and the projecting end of the power take-off shaft, an inner shaft journalled within the tubular shaft and projecting beyond it at each end, a one-half revolution clutch having its driving member secured to one end of the tubular shaft and its driven member secured to the adjacent end of the inner shaft, and lifting links eccentrically connected to the respective ends of the inner shaft.

2. The combination with a tractor having a transmission including a power take-off shaft, of a power lift mechanism comprising a rotatably mounted tubular shaft extending across the tractor body, a driving connection between said shaft and the power take-off shaft, an inner shaft journaled within the tubular shaft and projecting beyond it at each end, a plurality of one-half revolution clutches having each of their driving members secured to opposite ends of the tubular shaft and their driven members journaled on the inner shaft, lifting links, and means connecting the lifting links to the driven members of the one-half revolution clutches for reciprocating the aforesaid links.

3. The combination with a tractor having a transmission including a power take-off shaft, of a power lift mechanism comprising a rotatably mounted tubular shaft laterally extending with respect to the tractor body, a driving connection between said shaft and the power take-off shaft, a plurality of one-half revolution clutches having each of their driving members secured to opposite ends of the tubular shaft and their driven members journaled adjacent the driving members, lifting links, means connecting the lifting links to the driven members of the one-half revolution clutches for reciprocating the aforesaid links, and means for tripping the aforesaid clutches whereby either of said clutches may be operated alone, or simultaneously.

4. The combination with a tractor having a transmission including a power take-off shaft, of a power lift mechanism comprising a rotatably mounted shaft extending laterally across the tractor body, a driving connection between said shaft and the power take-off shaft, a plurality of one-half revolution clutches having each of their driving members secured to opposite ends of the laterally extending shaft on each side of the tractor body and their driven members journaled adjacent the driving members, lifting links, means connecting the lifting links to the driven members of the one-half revolution clutches for reciprocating the aforesaid links, and means for tripping the aforesaid clutches whereby either of said clutches may be operated alone, or simultaneously.

5. The combination with a tractor having a transmission including a power take-off shaft, of a power lift mechanism comprising a rotatably mounted shaft laterally extending with respect to the tractor body, a driving connection between said shaft and the power take-off shaft, means mounted on the laterally extending shaft for communicating intermittent cycles of movement in the same direction of rotation as said shaft, and means for adjusting the laterally extending shaft vertically with respect to the power take-off shaft.

6. The combination with a tractor having a transmission including a power take-off shaft, of a power lift mechanism comprising a rotatably mounted shaft laterally extending with respect to the tractor body, a driving connection between said shaft and the power take-off shaft, means mounted at each end of the laterally extending shaft for communicating intermittent cycles of movement in the same direction of rotation as said shaft, and means for adjusting the laterally extending shaft vertically with respect to the power take-off shaft.

7. The combination with a tractor having a transmission including a power take-off shaft, of a power lift mechanism comprising a rotatably mounted shaft laterally extending with respect to the tractor, a multiple chain link driving connection between said shaft and the power take-off shaft, means mounted on the laterally extending shaft for communicating intermittent cycles of movement in the same direction of rotation as said shaft, and means for adjusting the laterally extending shaft vertically with respect to the power take-off shaft, whereby the tension of the chain driving connection may be adjusted.

8. The combination with a tractor having a transmission including a power take-off shaft, of a power lift mechanism comprising a rotatably mounted shaft laterally extending with respect to the tractor, a multiple, separable chain link driving connection between said shaft and the power take-off shaft, means mounted on the laterally extending shaft for communicating intermittent cycles of movement in the same direction of rotation as said shaft, and means for adjusting the laterally extending shaft vertically with respect to the power take-off shaft, whereby a chain link may be added to or taken from the chain driving connection.

9. The combination with a tractor, of a power lift mechanism comprising a rotatably mounted shaft, eccentric bearing means journaled on said tractor, said shaft being journaled within said eccentric bearing means, whereby said shaft may be adjusted vertically with respect to the tractor by rotation of the bearing means.

10. The combination with a tractor, of a power lift mechanism comprising a rotatably mounted shaft, bearing means for journaling the aforesaid shaft, supporting means for adjustably mounting the bearing means which has the shaft journaled therein eccentric to the supporting means, and means for adjustably securing the bearing means in adjusted position, whereby the shaft will be adjusted vertically with respect to the tractor.

11. The combination with a tractor, of a power lift mechanism comprising a rotatably mounted tubular shaft, an inner shaft journaled within said tubular shaft and concentric therewith, adjusting means for journaling the aforesaid tubular shaft therein, whereby said inner shaft may be adjusted vertically with respect to the tractor.

12. The combination with a tractor having a transmission including a power take-off shaft, of a plurality of power lift mechanisms for changing the rotary motion of the power take-off shaft to intermittent rotary motion, a common driving connection between said power take-off shaft and the power lift mechanisms, forwardly and rearwardly extending links located on each side of the tractor and operable in planes longitudinally with respect to the tractor, means for connecting a forward extending link to a rearwardly extending link, means for connecting each power lift mechanism to each pair of forwardly and rearwardly extending links to reciprocate the aforesaid links, and means for tripping the aforesaid mechanisms whereby either of said pairs of forwardly and rearwardly interconnected links may be reciprocated alone on either side of the tractor.

13. The combination with a tractor having a transmission including a power take-off shaft, of a plurality of power lift mechanisms for changing the rotary motion of the power take-off shaft to intermittent rotary motion, a common driving connection between said power take-off shaft and the power lift mechanisms, forwardly and rearwardly extending links located on each side of the tractor and operable in planes longitudinally with respect to the tractor, means for connecting a forward extending link to a rearwardly extending link, means for connecting each power lift mechanism to each pair of forwardly and rearwardly extending links to reciprocate the aforesaid links, and means for tripping the aforesaid mechanisms whereby both pairs of forwardly and rearwardly interconnected links may be reciprocated simultaneously.

14. The combination with a tractor having a transmission housing including a power take-off shaft extending through the transmission housing with a plurality of connecting means on said shaft for taking power therefrom, one of said connecting means being forward of the transmission housing and the other at the rear of the transmission housing, power transmitting mechanism attached to the forward connecting means on the power take-off shaft, an overload release means in the power transmitting mechanism, whereby, upon the overload of said power transmitting mechanism, the power take-off shaft will continue to rotate to furnish continuous torque at the rear connecting means of the power take-off shaft.

15. Power transmitting mechanism for tractors having a power take-off shaft and connecting means thereon, comprising a housing secured to the tractor and having mounted in said housing an extension shaft for securing to the power take-off shaft, a laterally extending driving shaft, means for driving said laterally extending shaft from said extension shaft, and an overload release means between said extension shaft and said laterally extending driving shaft; whereby, upon the operation of the power transmitting mechanism, if an obstruction is encountered, the power take-off shaft will continuously rotate.

16. In a power transmitting mechanism as set forth in claim 15, the aforesaid overload release means comprising means for automatically resetting the overload release means upon the removal of the overload.

17. In a power transmitting mechanism as set forth in claim 15, the aforesaid overload release means comprising a spring relief mechanism including a pair of interengaging clutch members, one of said clutch members being driven from the aforesaid extension shaft and spring biased for reacting against the other clutch member to hold said clutch members in substantially rigid relation for the transmission of torque from said extension shaft to said laterally extending shaft.

18. In a power transmitting mechanism as set forth in claim 15, the aforesaid overload release means comprising a spring relief mechanism including a pair of interengaging clutch members, one of said clutch members being driven from the aforesaid extension shaft and spring biased for reacting against the other clutch member to hold said clutch members in substantially rigid relation for the transmission of torque from said extension shaft to said laterally extending shaft, and means on the aforesaid extension shaft for allowing the spring biased clutch member to move longitudinally thereof upon the overload of said clutch members and to rotate relative to the other clutch member.

19. Power transmitting mechanism for tractors having a power take-off shaft and connecting means thereon, comprising a housing secured to the tractor and having mounted in said housing an extension shaft for securing to the power take-off shaft, a laterally extending driving shaft, means for driving said laterally extending shaft from said extension shaft, and clutch means in said driving connection, said clutch means comprising a plurality of coacting clutch members, and means whereby one of said coacting members may rotate relative to another coacting member.

ALEXUS C. LINDGREN.

CERTIFICATE OF CORRECTION.

Patent No. 2,057,650.                                October 13, 1936.

ALEXUS C. LINDGREN.

It is hereby certified that error appears in the printed specification of the above numbered patent requiring correction as follows: Page 1, second column, line 15, strike out the words "Figure 7 is a side view of Figure 6 with the" and insert instead Figure 8 is an enlarged transverse sectional view; and that the said Letters Patent should be read with this correction therein that the same may conform to the record of the case in the Patent Office.

Signed and sealed this 28th day of June, A. D. 1938.

Henry Van Arsdale,
Acting Commissioner of Patents.

(Seal)